June 24, 1930. A. G. REDMOND 1,766,686
FUEL FEEDING SYSTEM FOR MOTOR VEHICLES
Filed June 15, 1927 2 Sheets-Sheet 1
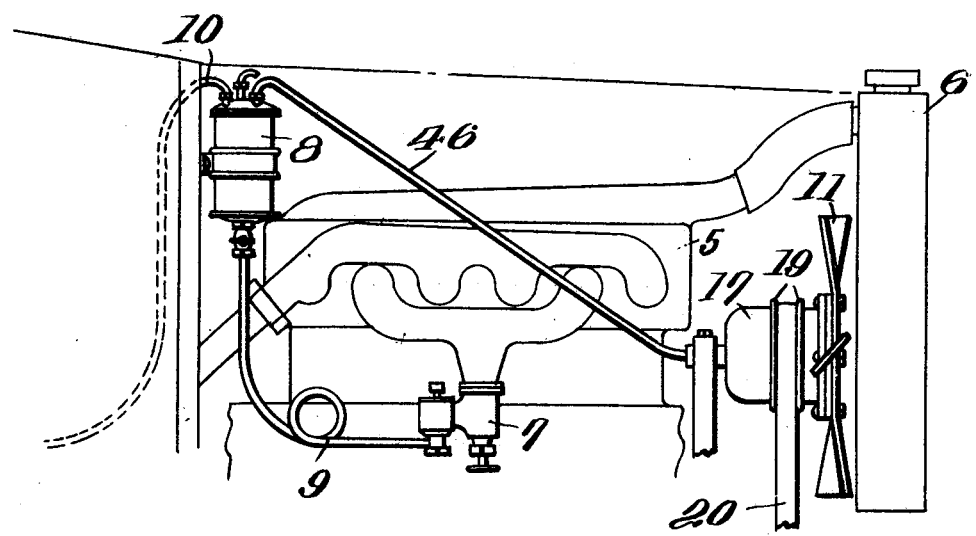
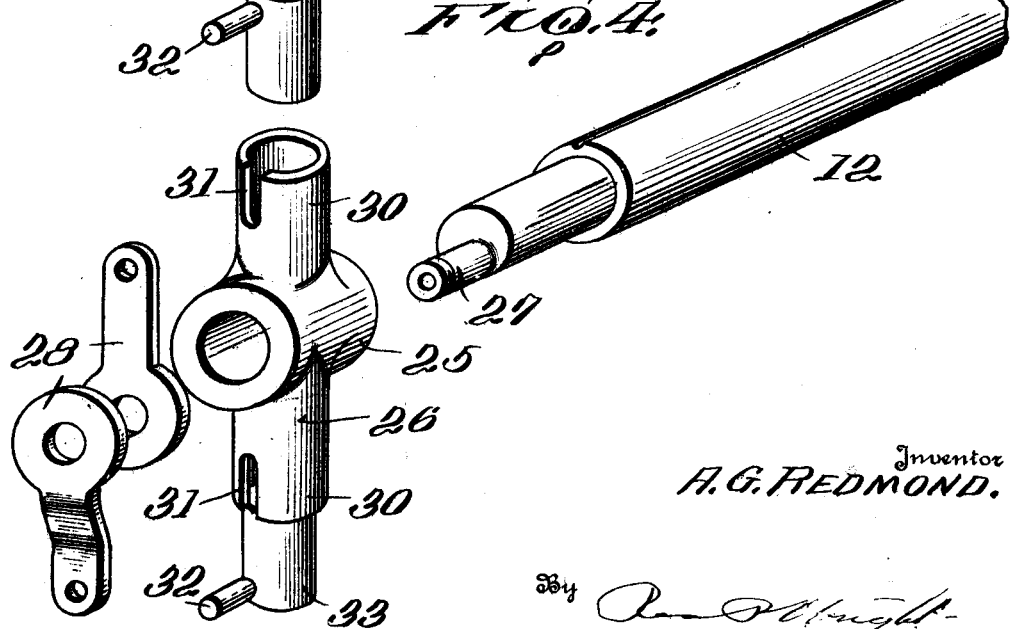
Inventor
A. G. REDMOND.

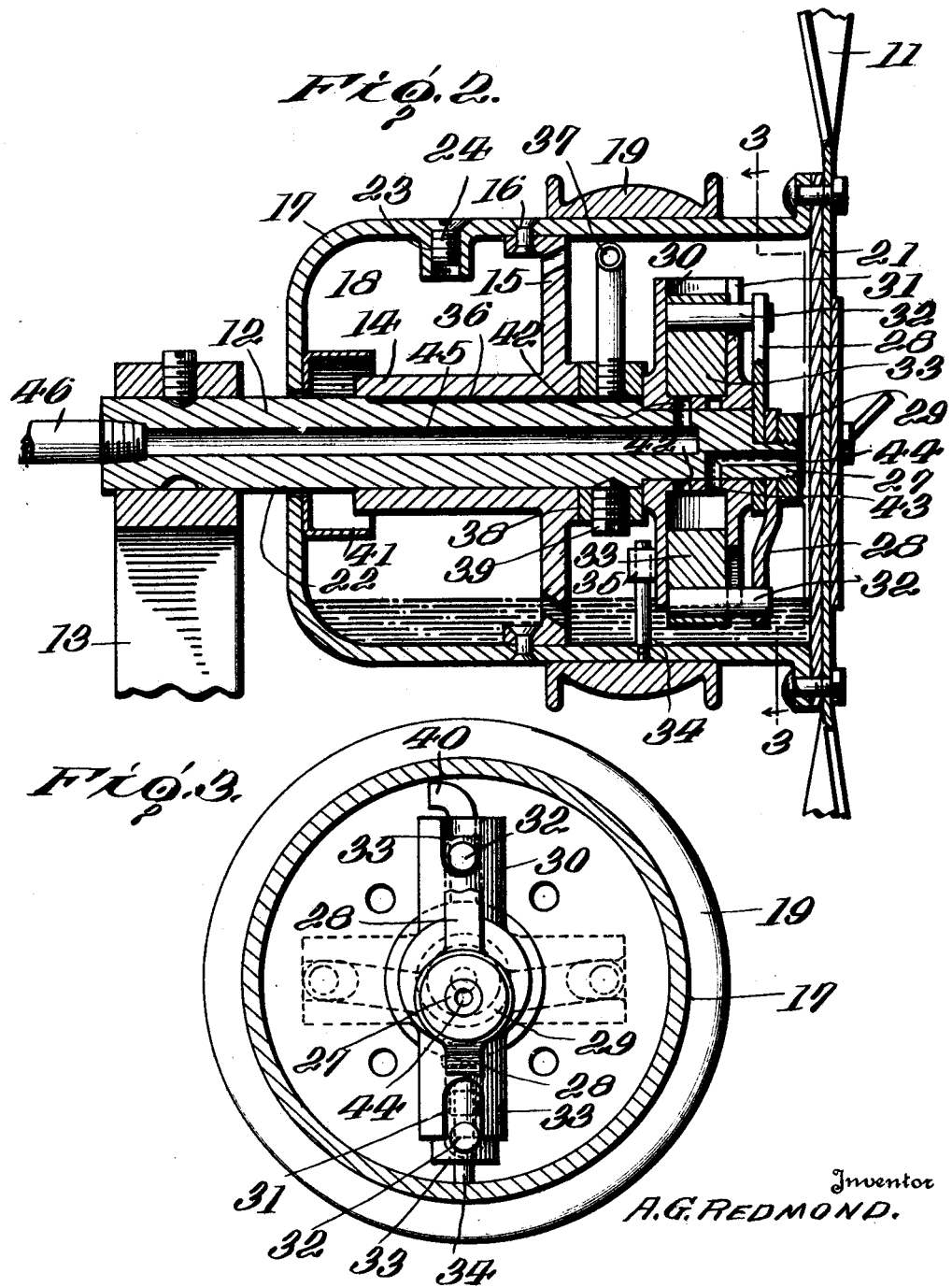

Patented June 24, 1930

1,766,686

UNITED STATES PATENT OFFICE

ALBERT G. REDMOND, OF FLINT, MICHIGAN, ASSIGNOR TO JACOB RICHARD FRANCIS, OF FLINT, MICHIGAN

FUEL-FEEDING SYSTEM FOR MOTOR VEHICLES

Application filed June 15, 1927. Serial No. 199,114.

Vacuum fuel feed tanks connected with and operated by the low pressure existing in the inlet manifold of explosive engines to supply fuel to the carburetor have been found to be inefficient under certain conditions, particularly when, due to the engine throttle being widely opened incident to heavy loads being imposed on the engine, the pressure in the manifold is always slightly above atmospheric, and especially so when the vacuum tank is combined with other vacuum operated vehicle accessories, such for instance as vacuum operated windshield wipers.

The invention has for its object to provide means for supplying a constant vacuum to insure uninterrupted supply of fuel to the vacuum tank, which means is operated from a driven part of the engine, preferably the cooling fan.

A further object of the invention is to so combine the fan hub and pulley with a vacuum pump adapted to supply the vacuum, as to provide a unitary structure of compact and inexpensive form.

A further object is the provision of means for insuring efficient lubrication of the fan hub and the working parts of the vacuum pump.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a fragmentary side elevation of the engine and adjacent parts of a motor vehicle, illustrating the invention applied thereto.

Fig. 2 is an enlarged fragmentary section through the fan hub, and supporting arm.

Fig. 3 is a section taken on line 3—3 of Fig. 2.

Fig. 4 is a perspective view of the parts of the vacuum pump detached.

Referring to the drawings in detail, the numeral 5 indicates the engine of a motor vehicle connected with the usual radiator 6, and provided with the carburetor 7, the latter being connected with the usual vacuum fuel supply tank 8 by a fuel pipe 9. As usual, the tank 8 is connected with the main storage tank (not shown) by the feed pipe 10.

The cooling fan 11 is located as usual, behind the radiator 6, and is supported in position by a shaft 12 secured in an arm 13 suitably mounted on the engine 5.

The hub of the fan is constituted by the sleeve-like hub part 14, provided with a flange 15 riveted at 16 to a shell 17, of such size as to provide an internal chamber 18. The fan pulley 19 is mounted on the shell 17 and receives a belt 20 by which the fan is driven from the engine crank shaft in the usual manner. The front end of the shell 17 is closed by a plate 21 to which the blades of the fan 11 are secured, while the rear extremity thereof is provided with an opening of sufficient size to provide a passage 22 for outgoing air. A filling port 23, for facilitating introduction of lubricating oil, is provided in the shell 17, and is normally closed by a screw 24, and, as will be understood, the fan is mounted to freely turn on the stationary supporting shaft 12.

The front extremity of the shaft 12 is reduced, and is received within the central hub portion 25 of the pump cylinder block 26. The front extremity of the shaft 12 terminates in an eccentrically disposed crank pin 27 on which are engaged the connecting rods 28, the latter being confined thereon by a nut 29, threaded on the extremity of the crank pin 27.

The cylinder block 26 includes two opposed cylinders 30 having slots 31 therein, receiving the pins 32, carried by the pump pistons 33. The cylinder block is caused to turn with the fan hub by a pin 34 fixed to the shell 17 and engaging in a lug 35 on one of the cylinders.

The inner extremities or heads of the cylinders 30 are provided with inlet and outlet ports 42 and 43, respectively, the inlet ports 42 being adapted during rotation of the fan, to successively register with an outlet port 44 formed in the shaft 12 and communicating by a passage 45 with the vacuum pipe 46 leading to the vacuum tank 8.

To insure proper and continual lubrication of the fan hub and the working parts of the pump, the shell 17 is partially filled with fluid lubricating oil, and is supplied to the groove 36 in the shaft 12 by a pipe 37 secured in a collar 38, fixed at 39 to the shaft, and having an angularly disposed extremity 40. Due to the action of centrifugal force, the body of fluid contained in the shell 17 during rotation of the latter, is caused to collect about the interior of the shell, and entering the upper angular extremity of the oil pipe 27, flows by gravity into the groove 14, thus lubricating the hub of the fan. A guard 41 is secured to the shell 17, and extending inwardly over the hub part 14, prevents the escape of the lubricant through the passage 22.

Although I have shown and described the pump as being applied to, and operated by the cooling fan of an explosive engine, because this application of the invention is regarded as most practical, however, it will be readily understood that the pump may be applied to such other driven parts of an engine as the generator, water or oil pump, and other like parts.

In operation, the fan 11 is operated continually during the operation of the explosive engine 5 by the belt 20, and regardless of pressure conditions existing in the intake manifold, a constant supply of vacuum in the tank 8 is assured by the operation of the pump unit enclosed within the hub shell of the fan. Incident to rotation of the fan, the rotary motion of the cylinder block 26, entrained by the shell 17, produces a reciprocatory movement of the pistons 33, owing to the eccentric mounting of the connecting rods 28 on the shaft 12, and on the out or suction stroke of the piston, the port 42 moving into registration with the port 44, withdraws fluid from the passage 45 and creates a vacuum in the pipe 46 and tank 8. As the piston moves inwardly, on its compression stroke, the port 42 moves out of registration with the port 44, closing communication with the passage 45, and establishing communication between the outlet port 43 and the outlet port 44, provided in the extremity of the shaft 12. The fluid discharged through the passage 44 into the chamber 18 of the shell, is finally discharged through the passage 22.

As stated before, a sufficient quantity of lubricant is introduced in the shell 17 to assure that during rotation, when the body of fluid moves outwardly against the shell 17, the extremity of the pipe 27 is continually submerged, and the lubricant will flow downwardly therein, lubricating the hub part 14. As will be understood, the splash of the lubricant during operation of the engine, will effectively maintain all parts of the pump assembly in thoroughly lubricated condition.

While the present device was specifically devised for fuel feeding, it is obvious that such a constantly driven vacuum pump can be used to operate various other devices on a motor vehicle, for instance, the windshield wiper, and I consider such embodiments as falling within the scope of my invention.

From the foregoing, it is believed that the construction, operation and advantages of the invention may be readily understood by those skilled in the art, and I am aware that changes may be made in the details disclosed without departing from the spirit of the invention as expressed in the claims.

What I claim is:

1. In an internal combustion engine power plant, a hollow fixed supporting shaft, a fan provided with a hub mounted on said shaft, driving means for said hub, and vacuum producing means enclosed in said hub and actuated by the driven member for drawing air through said hollow shaft.

2. In an internal combustion engine power plant, a fixed hollow shaft, a hub journaled thereon and including a shell, said shell enclosing one extremity of said shaft and a vacuum pump received in said shell and actuated thereby for producing a vacuum having an inlet in communication with said hollow shaft.

3. In an internal combustion engine power plant, a fixed hollow shaft, a hub journaled on said shaft including a shell having an inlet in communication with said hollow shaft, and means for introducing lubricant into said shell, a vacuum pump arranged within said shell adapted for lubrication by the lubricant contained therein.

4. In combination, a shaft, a hub journaled on said shaft and including a shell, means for introducing lubricant into the shell, said shell enclosing one extremity of said shaft, a vacuum pump enclosed by said shell and adapted for lubrication by the lubricant contained therein, and a pipe extending from a point adjacent the shell to the shaft, supplying lubricant to the latter and the hub.

5. In combination, a shaft, a hub journaled thereon including a shell, said shell enclosing one extremity of the shaft and having an aperture in the opposite extremity receiving said shaft, an oil guard arranged about the opening, means for introducing lubricant into the shell, and a pump received by the shell and adapted for lubrication by the lubricant contained therein.

6. In combination, a shaft, a hub journaled thereon including a shell, said shell enclosing one extremity of the shaft and having an aperture in the opposite extremity receiving said shaft, an oil guard arranged about the opening, means for introducing lubricant into the shell, and a pump received by the shell and adapted for lubrication by the lubricant contained therein, said pump being supported by said shaft.

7. In combination, a shaft, a hub journaled thereon including a shell, said shell enclosing one extremity of the shaft and having an aperture in the opposite extremity receiving said shaft, an oil guard arranged about the opening, means for introducing lubricant into the shell, and a pump enclosed by the shell and adapted for lubrication by the lubricant contained therein, said pump being supported upon the enclosed extremity of the shaft.

8. In combination, a shaft, a hub journaled thereon including a shell, said shell enclosing one extremity of the shaft and having an aperture in the opposite extremity receiving said shaft, an oil guard arranged about the opening, means for introducing lubricant into the shell, a pump received by the shell and adapted for lubrication by the lubricant contained therein, and means connecting the shell with the pump to impart motion to the latter.

9. In combination, a shaft having non-communicating ports therein, a cylinder block journaled on said shaft having ports movable into registration with the first mentioned ports, an eccentric pin carried by the shaft, pistons in the cylinder block, means connecting the pins and pistons, a rotatable member journaled on said shaft, and means connecting said rotatable member with the cylinder block.

10. In combination, a shaft having non-communicating ports therein, a cylinder block journaled on said shaft having ports movable into registration with the first mentioned ports, an eccentric pin carried by the shaft, pistons in the cylinder block, means connecting the pins and pistons, a rotatable member journaled on said shaft, and means connecting said rotatable member with the cylinder block, said rotatable member including a hub part and a shell enclosing the hub and cylinder block.

11. In combination, a shaft having non-communicating ports therein, a cylinder block journaled on said shaft having ports movable into registration with the first mentioned ports, an eccentric pin carried by the shaft, pistons in the cylinder block, means connecting the pins and pistons, a rotatable member journaled on said shaft, and means connecting said rotatable member with the cylinder block, said rotatable member including a hub part and a shell enclosing one extremity of the shaft and the cylinder block.

12. In an internal combustion engine power plant, a fixed hollow shaft, a hub part journaled on said shaft, a shell carried by said hub part, a pump comprising a cylinder block including cylinders journaled on said shaft and means for causing the cylinder block to turn as a unit with the shell for operating said pump for drawing air through said hollow shaft.

In testimony whereof I hereunto affix my signature.

ALBERT G. REDMOND.